(12) United States Patent
Gretz

(10) Patent No.: US 6,517,032 B1
(45) Date of Patent: Feb. 11, 2003

(54) LOCKING U-SHAPED CABLE SUPPORT

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 10/084,280

(22) Filed: Feb. 25, 2002

Related U.S. Application Data

(63) Continuation-in-part of application No. 09/956,614, filed on Sep. 19, 2001, and a continuation-in-part of application No. 09/956,611, filed on Sep. 19, 2001, which is a continuation-in-part of application No. 09/790,047, filed on Feb. 21, 2001.

(51) Int. Cl.[7] .................................................. F16L 3/22
(52) U.S. Cl. ........................... 248/69; 248/62; 248/68.1; 248/74.1
(58) Field of Search ............................ 248/69, 60.1, 62, 248/49, 73, 74.1, 74.3, 229.1, 313, 340, 305; 24/15 PB, 25 P, 598.2, 601.1, 600.9

(56) References Cited

U.S. PATENT DOCUMENTS

| | | | | |
|---|---|---|---|---|
| 2,466,247 A | * | 4/1949 | Land | 248/62 |
| 3,051,424 A | * | 8/1962 | Duhamel | 248/62 |
| 3,273,838 A | * | 9/1966 | Fletcher et al. | 248/62 |
| 3,363,865 A | * | 1/1968 | Metsker | 248/62 |
| 4,252,289 A | * | 2/1981 | Herb | 248/62 |
| 4,783,029 A | * | 11/1988 | Geppert et al. | 24/459 |
| 5,110,074 A | * | 5/1992 | Deguchi | 248/340 |
| 5,961,081 A | * | 10/1999 | Rinderer | 248/305 |
| 6,138,960 A | * | 10/2000 | Carbonare et al. | 248/62 |
| 6,164,604 A | * | 12/2000 | Cirino et al. | 248/74.3 |

* cited by examiner

Primary Examiner—Leslie A. Braun
Assistant Examiner—Tan Le

(57) ABSTRACT

A locking U-shaped cable support that reduces potential wire abrasion, minimizes magnetic interference to communication signals, and provides a wide opening feature that permits easy insertion of cables without first twisting them. The shape and flexibility of the improved locking cable support enable it to be opened wider than prior art metallic bridle rings, allowing easier insertion of wires. Non-metallic construction minimizes potential wire abrasion and reduces the possibility of magnetic interference with communication signals. A wide surface in the ring portion provides a comfortable seat for cables with minimal bending of cables between supports.

1 Claim, 6 Drawing Sheets

LOCKING U-SHAPED CABLE SUPPORT

This application is a continuation-in-part of copending U.S. patent application Ser. No. 09/956,614, filed Sep. 19, 2001, entitled "LOCKING CABLE SUPPORT" which is a continuation-in-part of copending U.S. patent application Ser. No. 09/790,047, filed Feb. 21, 2001, entitled "BRIDLE RING FOR ELECTRICAL AND COMMUNICATION CABLE" and is also a continuation-in-part of copending U.S. patent application Ser. No. 09/956,611, filed Sep. 19, 2001, entitled "ROD CABLE SUPPORT."

FIELD OF THE INVENTION

This invention relates to cable supports and specifically to an improved non-metallic locking cable support.

BACKGROUND OF THE INVENTION

It is common in the electrical industry to support communication cables using a bridle ring. A bridle ring is a cable support that is constructed from a small diameter rod of steel of one-piece that is bent into a circular hoop with a connection mechanism, such as a threaded connector or a friction clip, at one end. It is typically used to support horizontal or vertical runs of electrical cables by suspending the cables through the circular hoop section. Typically, to contain the cables that will be inserted therein, the hoop section of prior art bridle rings is bent to almost 360° in radius, with just a narrow gap remaining for insertion of cables. As a consequence of the limited size of the gap in prior art bridle rings and the rigid metallic construction, cable bundles are not easily fit therein.

Bridle rings are typically used to support telecommunication cables such as those specified in the ANSI/TIA/EIA-568 industry standard for telecommunication cabling systems. Within this standard, three types of cables are recognized for horizontal cabling and include 4-pair 100 ohm UTP (unshielded twisted pair) cable, 2-pair 150 ohm STP (shielded twisted pair) cable, and 2-fiber, 62.5/125 micron optical fiber cable. Category 5 cable refers to a designation applied to UTP (unshielded twisted pair) cable whose transmission rates are specified up to 100 MHz.

When supporting telecommunication cables with existing art bridle rings, it is common for the individual cables in the bundle to be bent, twisted, or otherwise damaged as a result of the limited size of the gap, the rigid construction, and the small diameter of the metal rod utilized in constructing the ring. The metal rod that the bridle ring is constructed from is typically 0.25" in diameter and can disturb the small cables that are within telecommunications cables. Bending and twisting of conductors caused when inserting cables into prior art bridle rings can adversely affect the data transmission rate, which becomes more critical in cables having higher transmission rates, such as Category 5 telecommunications cables. Some manufacturers have attempted to correct the deficiencies of existing art bridle rings by attaching a curved piece of plastic to provide a better surface for supporting the cables. The piece of plastic is typically snapped on in a separate operation and increases the production costs of the existing art bridle ring.

In order to overcome some of the shortcomings of traditional bridle rings, the assignee of the present invention filed U.S. patent application Ser. No. 09/790,047 on Feb. 21, 2001, entitled "BRIDLE RING FOR ELECTRICAL AND COMMUNICATION CABLE", which is incorporated herein in its entirety by reference. This application provided an improved bridle ring of non-metallic construction with the ability to open wide to accept bundles of communications cables without having to twist together the cables in the bundle and a wider seat to better support cables without excessively bending individual cables.

On Sep. 19, 2001, the assignee of the present invention filed U.S. patent application Ser. No. 09/956,614, entitled "LOCKING CABLE SUPPORT", which provided further improvements to the bridle ring connector and is incorporated herein in its entirety by reference. The locking cable support of this application was also non-metallic, of unitary construction, provided a wide opening feature, included a wider seat or cable rest portion, and added a snap-fit feature to contain cables therein and improve the ability of the connector to retain cables within the ring portion in both horizontal and vertical orientations.

To provide an improved bridle ring cable support with an ability to snap fit onto threaded or smooth rods, the assignee of the present invention filed U.S. patent application Ser. No. 09/956,611 on Sep. 9, 2001, entitled "ROD CABLE SUPPORT", which is incorporated herein in its entirety by reference. This application provided a one-piece cable support with a snap fit feature enabling cables to be locked within the hanger and with the ability to snap onto threaded or smooth rods.

Although the previously mentioned patent applications addressed several disadvantages with existing art bridle ring connectors, additional improvements in the design of the locking bridle ring can be achieved by providing a larger cable holding capacity and an improved ability to snap fit onto smooth or threaded rods.

The present invention therefore addresses several obvious disadvantages with existing art bridle rings, including:

(a) Metallic construction may cause magnetic fields that interfere with modern high transmission rate telecommunication cables.

(b) The rigid ring and narrow gap causes distortion or damage of individual cables or separation of the twisted pair in UTP cables as they are inserted into the circular ring portion.

(c) Wire bundles must be twisted in order to fit them within traditional bridle rings, possibly damaging of individual cables within the bundle and negatively affecting transmission characteristics.

(d) It is impossible to fit bundles of cables into the narrow gap, as it is too small to accommodate them, therefore requiring the installer to insert each individual telecommunication cable one at a time and thereby greatly increasing installation time.

(e) The metallic rod used to form the bridle ring, having a small diameter, provides an insufficient seat for small diameter telecommunication cables thereby causing horizontally run cables to sag at the ring and sustain damage to the individual small wires in the bundle.

(f) The circular hoop portion of the bridle ring is small in diameter therefore limiting the amount of cables that may be inserted therein.

(g) Prior art cable supports designed to be supported from rods are limited to use with threaded rods and not smooth rods.

(h) Prior art cable supports designed to be supported from rods do not include a locking mechanism to secure cables therein.

(i) Prior art cable supports designed to be supported from rods are not of one-piece construction, therefore increasing their complexity and cost of manufacture.

Accordingly, what is needed is a one-piece locking bridle ring of non-metallic construction with a large cable holding capacity and the ability to snap fit onto either threaded or smooth rods.

OBJECTS OF THE INVENTION

The several objectives of the present invention include:

(a) Providing an improved bridle ring type hanger of non-metallic construction to reduce magnetic fields that interfere with modern high transmission rate telecommunication cables.

(b) Providing a wide-opening feature to eliminate distortion or damage of individual cables or separation of the twisted pair in UTP cables as they are inserted into the circular ring portion.

(c) Providing an improved hanger wherein wire bundles need not be twisted in order to fit them within the ring portion and thereby minimizing damage of individual cables within the bundle and negatively affecting transmission characteristics.

(d) Providing a wide-opening feature to allow rapid insertion of cables and thereby greatly reducing cable installation time.

(e) Providing a larger seat to reduce the distortion of cables supported by the hanger.

(f) Increasing the cable holding capacity of the bridle ring type hanger.

(g) Providing a cable support capable of snap fitting onto either threaded or smooth rods.

(h) Providing a cable support with a locking mechanism for securing cables therein.

(i) Providing a cable support of one-piece construction thereby reducing the complexity and cost of manufacture.

These and other advantages will become obvious by reading the attached specification with reference to the attached drawings.

SUMMARY OF THE INVENTION

The invention is a one-piece locking U-shaped cable support capable of holding a large capacity of cables and with the ability to snap fit onto threaded or smooth rods. A second embodiment is provided for more traditional attachment by means of a friction clip or fastener. The U-shaped cable support is of non-metallic construction and provides a wide-opening feature to allow insertion of cable bundles without twisting and a wide seat for minimizing bending of cables. The one-piece U-shaped cable support is easier to install than prior art cable supports and has a low cost of manufacture.

Figure 1:
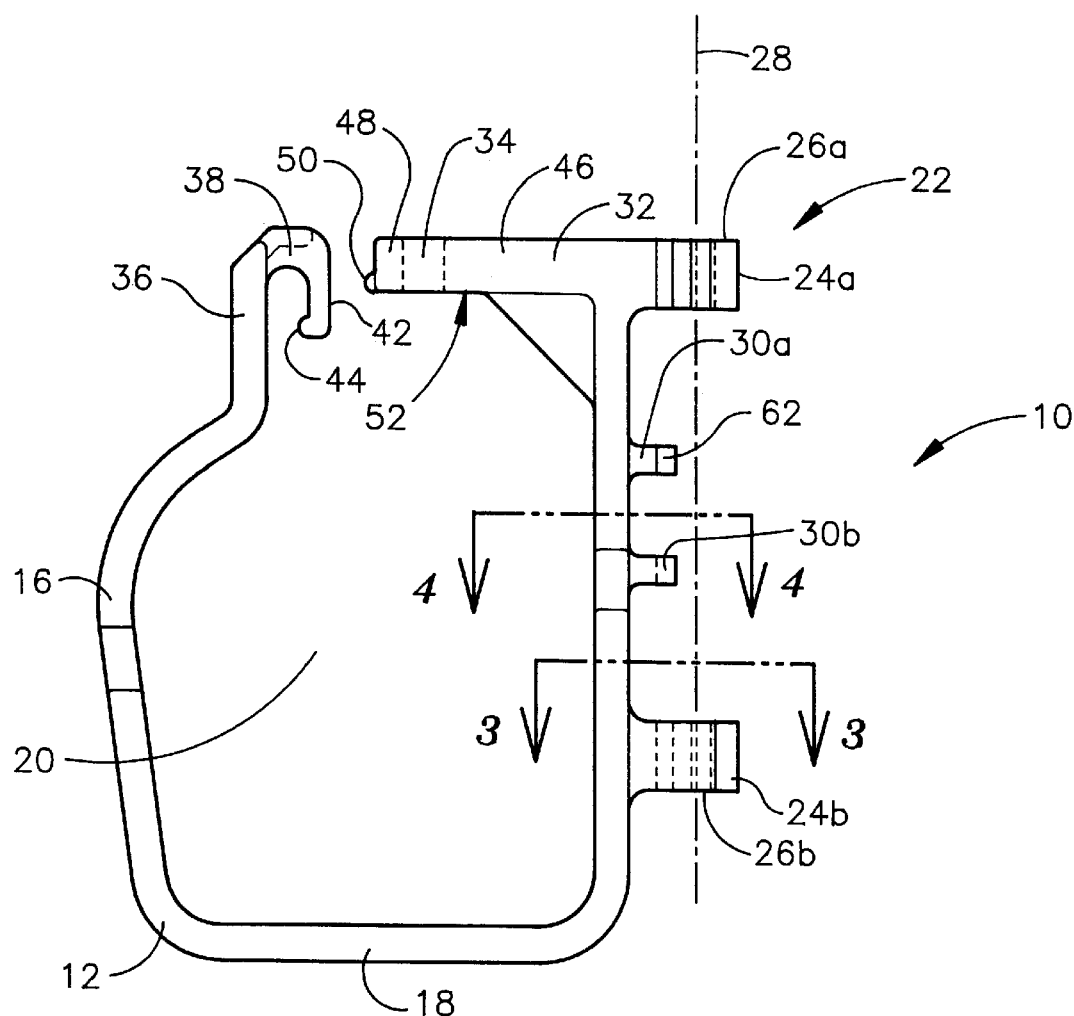
FIG. 1 is a plan view of a first and preferred embodiment of the locking U-shaped cable support of the present invention.

INDEX TO REFERENCE NUMERALS IN DRAWINGS 10 locking U-shaped cable support (first embodiment)
12 U-shaped member
14 first side
16 second side
18 bottom
20 interior space
22 attachment arrangement
24a first support arm
24b second support arm
26a aperture (in first support arm)
26b aperture (in second support arm)
28 axis
30a first integral brace
30b second integral brace
32 head extension
34 pocket
36 integral arm
38 hook
40 locking arrangement
42 nose portion
44 lip
46 inner portion
48 outer portion
50 nub
52 bottom surface (of head extension)
54 narrow gap
56 opening
58 outer edge (of support arm)
60 beveled entry surfaces
62 rod-engaging surface
64 rod
66 cable bundle or cables
68 seat
70 locking U-shaped cable support (second embodiment)
72 side extension
74 first aperture
76 second aperture
78 overhead structure
80 fastener

DETAILED DESCRIPTION OF THE INVENTION

Referring to FIG. 1, a plan view is shown of a first and preferred embodiment of the present invention, a locking U-shaped cable support designated by reference numeral 10. The locking U-shaped cable support 10 is of one-piece construction, typically molded of a durable polymeric material such as nylon. The locking cable support 10 includes a U-shaped member 12 that has a first side 14, a second side 16, and a bottom 18 that form a generally U-shaped interior space 20 through which cables (not shown) may be routed. An attachment arrangement 22 includes a first support arm 24a and a second support arm 24b integral with and adjacent the first side 14 and extending outwardly from the U-shaped member 12. Each support arm includes apertures 26a, 26b (denoted with dashed lines) that are in alignment with each other along common axis 28. Two integral braces 30a, 30b extend outwardly from the first side 14 of the U-shaped member 12 intermediate the two support arms 24a, 24b. An integral head extension 32 extends inwardly across the U-shaped member 12 from the top of the first side 14 and includes an aperture or pocket 34, shown in dashed lines, near the end of the head extension 32. The second side 16 includes an integral arm 36 including a hook 38 and a locking arrangement 40 to enable the hook 38 to be locked into the pocket 34 on the head extension 32 from the first side 14.

The locking arrangement includes a nose portion 42 integral with the hook 38 and a lip 44 integral with the nose portion 42. The head extension 32 can be described as having two portions on either side of the pocket 34 (shown in dashed lines), including an inner portion 46 and an outer portion 48 facing the arm 36. The outer portion 48 includes an integral nub 50 extending from the bottom surface 52 of the head extension 32.

Figure 2:
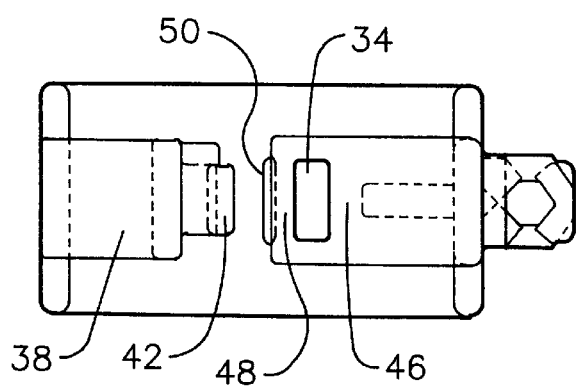
FIG. 2 is a top view of the locking U-shaped cable support of FIG. 1.

Referring to FIG. 2, a top view of the preferred embodiment of the locking U-shaped cable support 10 shows the pocket 34 located in the head extension 32. The inner 46 and outer 48 portions of the head extension 32 are located on either side of the pocket 34 with the integral nub 50 is extending from the outer portion 48. The top of the nose portion 42 is visible and integral with the hook 38.

Figure 3:
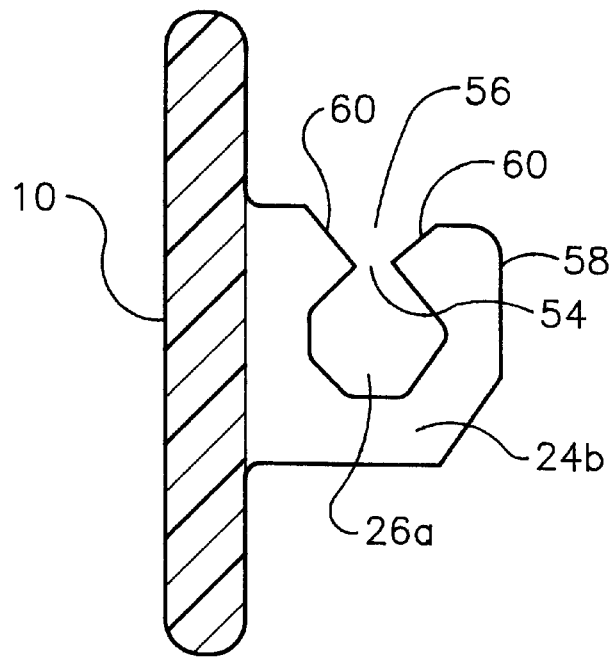
FIG. 3 is a sectional view of the U-shaped cable support taken along line 3—3 of FIG. 1.

Now referring to FIG. 3, a sectional view of the U-shaped cable support 10 taken along line 3—3 of FIG. 1, details are shown of the second support arm 24b. The second support arm 24b includes an aperture 26a and a narrow gap 54 that creates an opening 56 from the outer edge 58 of the second support arm 24b into the aperture 26a. The opening 56 includes beveled entry surfaces 60 as shown. The first support arm, not shown in FIG. 3, would include the same design features as the first support arm 24a but with the opening oriented 180° away from the opening of the second support arm.

Figure 4:
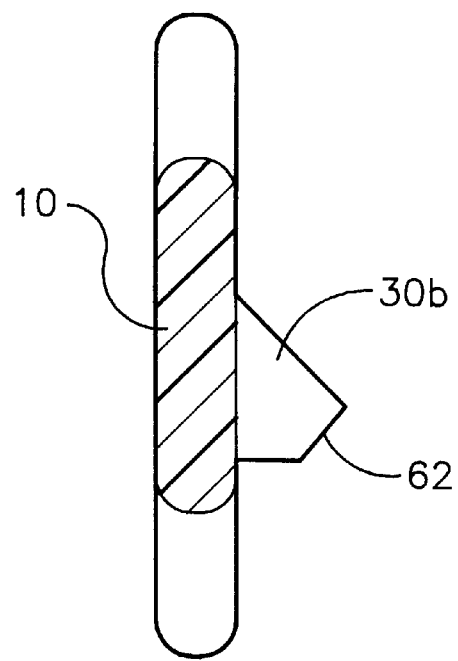
FIG. 4 is a sectional view of the U-shaped cable support taken along line 4—4 of FIG. 1.

As shown in FIG. 4, a sectional view of the U-shaped cable support 10 taken along line 4—4 of FIG. 1, the second integral brace 30b includes a rod-engaging surface 62 as shown. As shown in FIG. 1, the first integral brace 30a would also include a rod engaging surface 62 but it would be oriented in the opposite direction as the second integral brace 30b.

Figure 5:
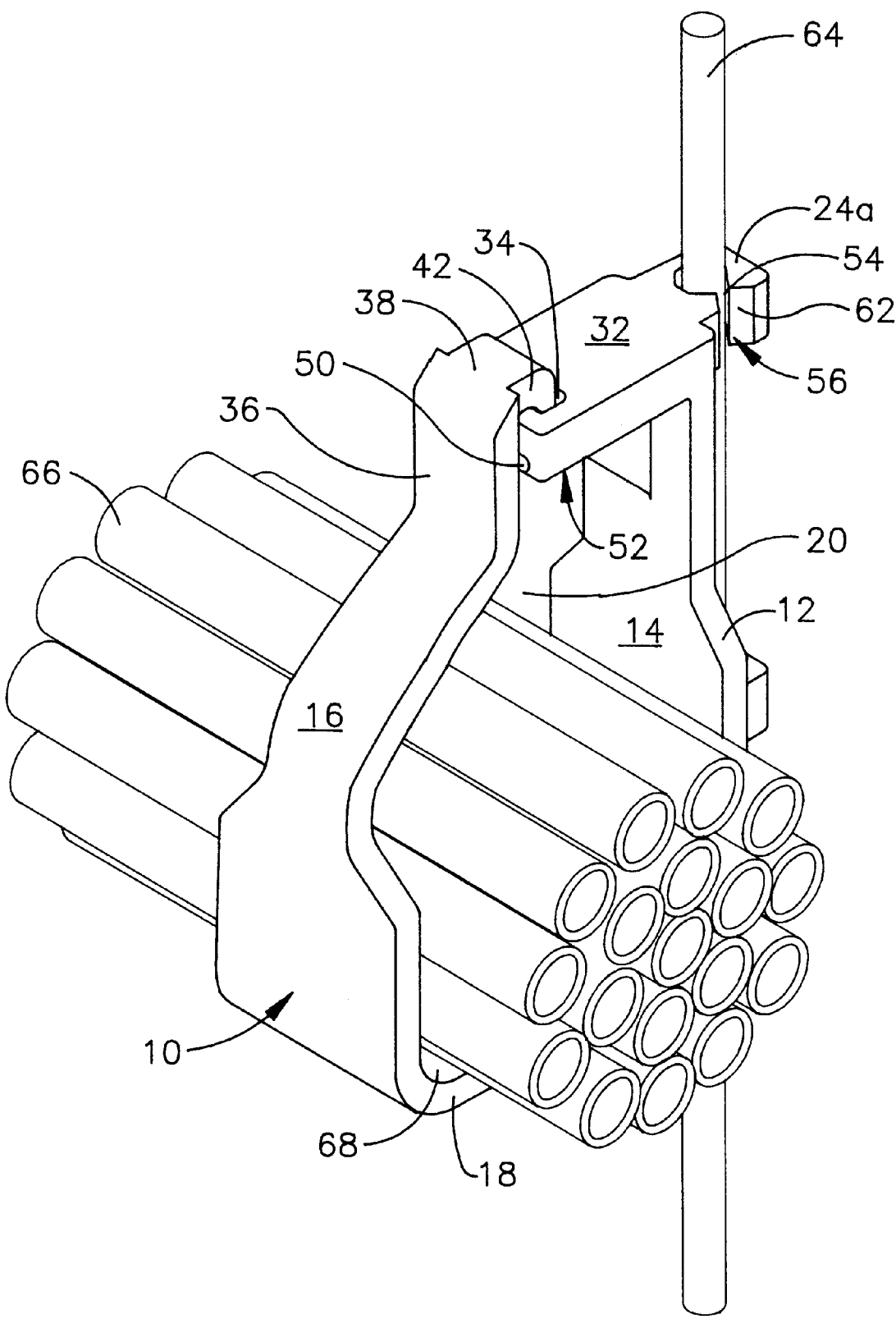
FIG. 5 is a perspective view of the U-shaped cable support of FIG. 1 attached to a vertical rod and supporting a bundle of cables, with the second side in the foreground.

Referring to FIG. 5, a perspective view is shown of the preferred embodiment of the U-shaped cable support 10 attached to a vertical rod 64 and supporting a bundle of cables 66 threaded through the interior space 20. The bottom portion 18 of the U-shaped member 12 is wide and functions as a seat 68 that will accept a bundle of cables 66 inserted therein.

Operation of the locking U-shaped cable support 10 may be understood by referring to FIG. 5. An installer would typically snap fit the cable support 10 onto a rod 64 by first bringing the outer portion of the first side 14 of the U-shaped member 12 against the rod 64 such that the rod 64 engages the beveled entry surfaces 60 on each of the support arms 24a, 24b. Each of the support arms 24a, 24b are then pushed against the rod 64 so that the rod forces the beveled surfaces 60 apart and widens the narrow gap 54. Since the U-shaped member 12 is preferably constructed of a resilient polymeric material such as nylon, the narrow gap 54 eventually widens to the width of the rod 64 and the rod snap fits into the aperture 26a, 26b on the respective support arm 24a, 24b. The support arms 24a, 24b are oriented such that the openings 56 face 180° apart and therefore, once snapped onto the rod 64, the support arms secure the U-shaped cable support 10 onto the rod. The integral braces (not shown), located intermediate of the two support arms 24a, 24b, further secure the cable support 10 to the rod 64 by rod-engaging surfaces 62 on the braces putting pressure against opposite sides of the rod. Although the locking U-shaped cable support 10 is depicted secured to a vertical rod 64 as shown in FIG. 5, it can easily be secured to a rod that is in any orientation, including horizontal.

Referring to FIG. 5 again, once the locking U-shaped cable support 10 has been secured to a rod 64, the integral arm 36 including the hook 38 may be bent outwards thereby exposing a wide opening into the interior space 20. Cables or a bundle of cables 66 may then be inserted within the cable support 10. The integral arm 36 may then be closed and the nose portion 42 inserted into the pocket 34 located on the head extension 32. As the nose portion 42 is advanced into the pocket 34, the nub 50 extending from the bottom surface 52 of the head extension 32 forces the nose portion 42 away from the integral arm 36. Eventually, as the nose portion 42 is advanced even farther into the pocket 34, the lip (not shown) on the nose portion 42 clears the bottom surface 52 of the head extension 32 causing the integral arm 36 to snap shut into the head extension 32. The cable bundle 66 is thereby locked within the interior of the locking U-shaped cable support 10. As previously mentioned, the U-shaped cable support 10 may be secured to a rod in any orientation, including a vertical rod, a horizontal rod, or anything in between the two. The locking arrangement will work in any orientation. As shown in FIG. 5, a wide seat 68 is provided at the bottom portion 18 to support the cable bundle 66 when the rod is oriented vertically. The first side 14 and second side 16 are also designed to provide a wide seat for those times when the cable support 10 is oriented other than vertically. The wide seat 68 provides more support to individual cables than traditional bridle ring supports and prevents the cables from bending excessively where held by a U-shaped cable support 10.

Figure 9:
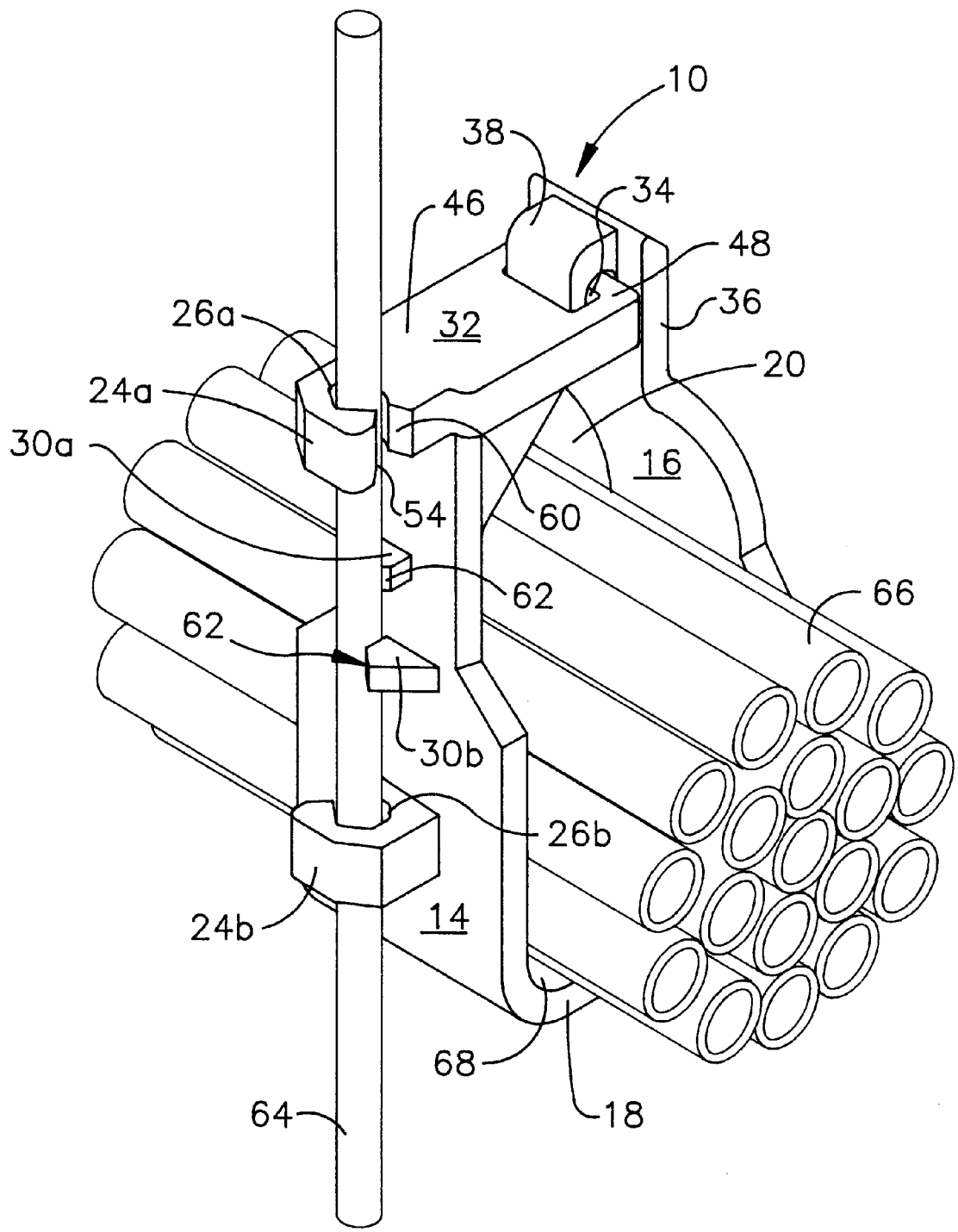
FIG. 9 is a perspective view of the U-shaped cable support of FIG. 1 attached to a vertical rod and supporting a bundle of cables, with the first side in the foreground.

Referring to FIG. 9, a perspective view of the first embodiment of the U-shaped cable support 10 shows the support attached to a rod 64 and supporting a bundle of cables 66. In this view, the first support arm 24a and the second support arm 24b are snap locked onto the rod 64. The first 30a and second 30b integral braces further secure the cable support 10 to the rod 64 by rod-engaging surfaces 62 applying pressure to opposite sides of the rod 64.

Figure 6:
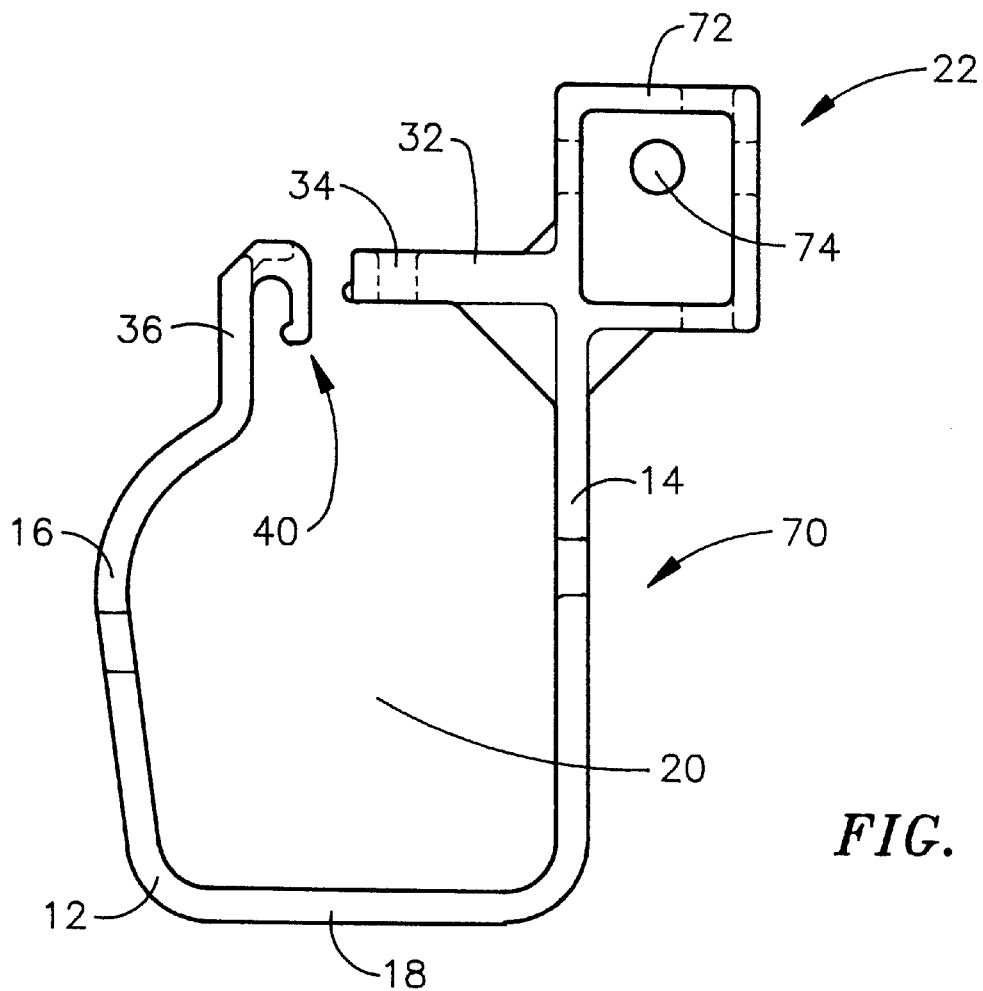
FIG. 6 is a plan view of a second embodiment of the locking U-shaped cable support.

Referring to FIG. 6, a plan view is shown of a second embodiment of the locking U-shaped cable support 70. The second embodiment contains the same features as the first embodiment including the U-shaped member 12, a first side 14, a second side 16, and a bottom 18 defining a space 20 therein for holding cables (not shown). The locking arrangement 40 is identical with the first embodiment including an integral arm 36 and a pocket 34 located in the head extension 32. The second embodiment differs from the first embodiment in the attachment arrangement 22 for securing the U-shaped member 12 to a structural support. The second embodiment includes a side extension 72 which includes a first aperture 74 for insertion of a fastener (not shown) or which may be used to attach a friction clip. The second embodiment of the locking U-shaped cable support 70 therefore may be employed in those situations in which a rod structural support is not available.

Figure 7:
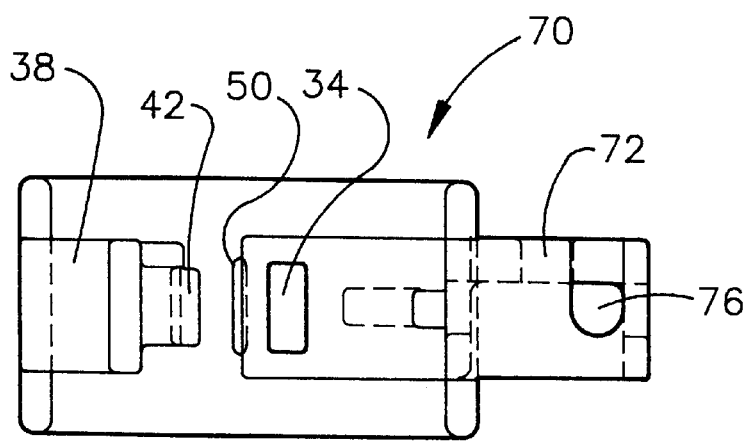
FIG. 7 is a top view of the locking U-shaped cable support of FIG. 6.

As shown in a top view of the second embodiment in FIG. 7, a second aperture 76 is available for securing the cable support 70 to a structural member (not shown) of a building.

Figure 8:
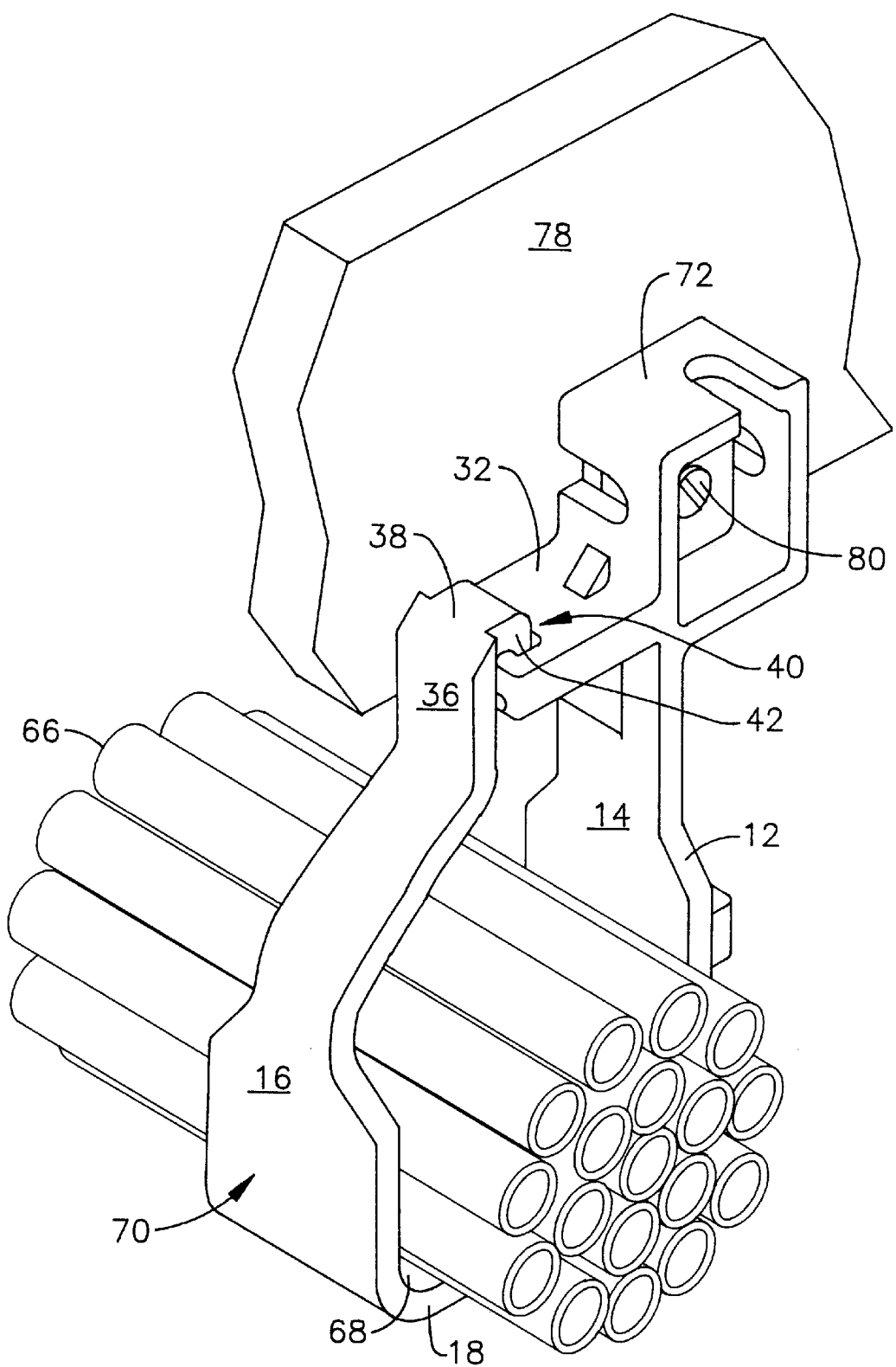
FIG. 8 is a perspective view of the U-shaped cable support of FIG. 6 attached to an overhead structure and supporting a bundle of cables.

Referring to the perspective view of the second embodiment in FIG. 8, the locking U-shaped cable support 70 may be attached to an overhead structure 78 by using a fastener 80. The locking arrangement 40 functions in the same manner as for the first embodiment to lock the cable bundle 66 within the support 70.

Accordingly, as described in the detailed description above, the rod cable support of the present invention has the advantage of being of one-piece construction, can be used with threaded or smooth rods, and provides for complete closure around cables without the use of cable ties. As a consequence of the positive locking action of the claw-shaped openings and brace upon an anchored rod and the snap-lock arrangement upon an inserted cable bundle, the rod cable support of the present invention can actually be used in conjunction with a rod anchored in any orientation, including horizontal. This is an advantage over existing rod cable supports with U-shaped hook members, as in an orientation other than vertical the cables tend to fall out of the U-shaped opening and must rapidly be secured with a cable tie to secure the cables.

Although the description above contains many specific descriptions and proposed sizes, these should not be construed as limiting the scope of the invention but as merely providing illustrations of some of the presently preferred embodiments of this invention.

Thus the scope of the invention should be determined by the appended claims and their legal equivalents, rather than by the examples given.

What is claimed is:
1. A one-piece locking cable support comprising:
   a U-shaped member having a first side, a second side, and a bottom defining a space therein for holding a plurality of cables;
   an integral extension from the top of said first side extending across the open top of said U-shaped member;
   an aperture in said extension;
   an arm integral with and extending from said second side to said extension with said arm resilient and capable of being bent away from said first side;
   a hook integral with and extending from said arm;
   a locking arrangement on said hook to enable said hook to be locked into said aperture;
   an attachment arrangement adjacent said first side to enable anchoring of said U-shaped member to a structural member, said attachment arrangement including:
      a first support arm integral with and extending from said first side;
      a second support arm integral with and extending from said first side;
      apertures in each of said support arms with said apertures in alignment with each other and capable of snap-fitting onto a rod; and
      two or more braces integral with and extending from said first side with the ends of said braces having opposing faces such that when said support arms engage a rod said opposing faces will exert force on opposite sides of the rod and further support the cable support on the rod.

\* \* \* \* \*